March 3, 1931.     H. A. SELAH     1,794,988
CONDUIT FITTING
Filed Feb. 17, 1927
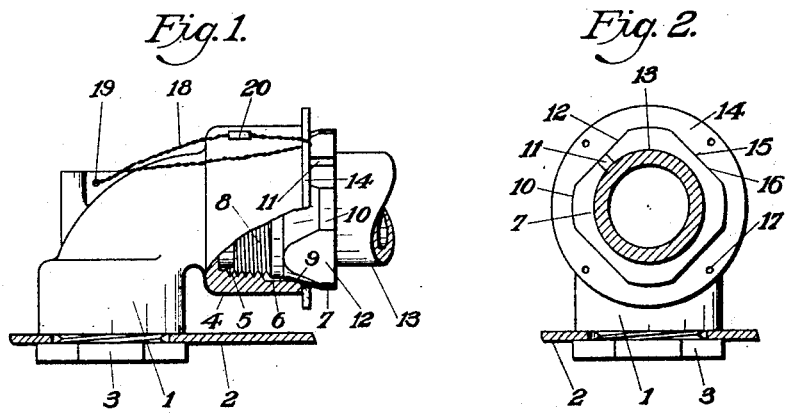
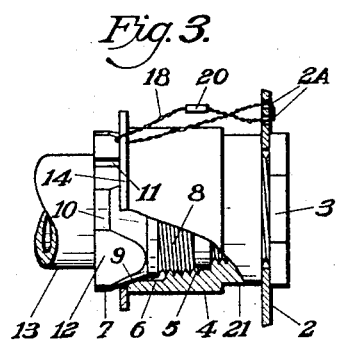
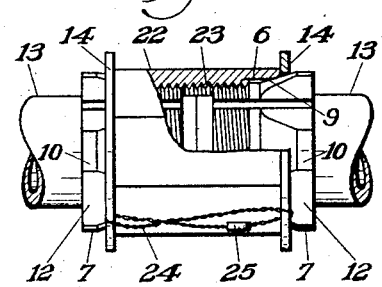
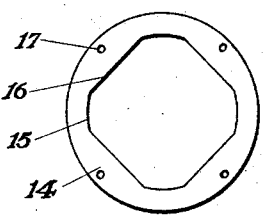
Howard A. Selah
INVENTOR.
BY
ATTORNEYS.

Patented Mar. 3, 1931

1,794,988

UNITED STATES PATENT OFFICE

HOWARD A. SELAH, OF ERIE, PENNSYLVANIA, ASSIGNOR TO ERIE MALLEABLE IRON COMPANY, OF ERIE, PENNSYLVANIA, A CORPORATION OF PENNSYLVANIA

CONDUIT FITTING

Application filed February 17, 1927. Serial No. 168,949.

This invention is designed to provide a seal lock for fittings adapted to secure threadless conduits.

Preferable embodiments of the invention are illustrated in the accompanying drawings as follows:—

Fig. 1 shows a side elevation of an elbow secured in a knock-out box comprising the device, the device being partly in section.

Fig. 2 an end view of the structure shown in Fig. 1.

Fig. 3 a side elevation, partly in section, showing a straight fitting in lieu of the elbow shown in Fig. 1.

Fig. 4 a side elevation, partly in section, of a fitting in the form of a coupling.

Fig. 5 a detached view of a locking plate.

In the structure shown in Fig. 1, 1 marks the body of the fitting. This is secured to the wall 2 of a knock-out box by means of a nut 3. The end of the fitting is provided with an opening 4 for receiving the conduit, the inner end of the opening being screw-threaded at 5 and provided with engaging surfaces 6 at the outer end.

A contractible sleeve 7 has a screw-threaded inner end 8, a tapered intermediate portion 9, and an outer wrench-hold portion 10. The sleeve is made contractible by a longitudinal slot 11. The outer end of the wrench-hold is of greater dimension than the opening in the end of the fitting and is provided with flats 12. By screwing the sleeve into place it is contracted and clamped on a conduit 13.

A locking plate 14 is provided with an opening 15 adapted to permit of its being placed on to the sleeve 7 and the opening is provided with flats 16 which engage the flats 12 on the sleeve, thus preventing the locking plate from turning on the sleeve. The locking plate is placed between the end of the fitting and the enlarged end of the sleeve and thus locked in place on the sleeve. The plate has a plurality of openings 17 and a sealing wire 18 is passed through one of these openings and an opening 19 in the fitting. The wire is closed by a seal 20.

It will readily be seen that with this seal in place the sleeve cannot be unscrewed so as to loosen the conduit without breaking the seal.

In the construction shown in Fig. 3 a straight fitting 21 is used instead of the elbow as shown in Fig. 1. The other portions of the structure are the same except that the wall 2 has the openings 2a for receiving the sealing wire.

In Fig. 4 the fitting has the coupling body 22 with screw threads 23 in its inner end. Each end of this body has a similar structure, a sleeve and clamping plate as the structure of Fig. 1. A sealing wire 24 extends through openings 17 and is closed with a seal 25, thus locking the sleeves at the ends against releasing movement without breaking the seal.

What I claim as new is:—

1. In a conduit fitting, the combination of a body having a conduit opening therein; a contractible sleeve in the opening having wedging engagement with the walls of the opening and screwed into the opening and contracted thereby; and a seal lock for the sleeve comprising a seal plate threaded on to the sleeve and locked against turning on the sleeve and arranged between the sleeve and the body, and means for sealing the plate against turning relatively to the body.

2. In a conduit fitting, the combination of a body having a conduit opening therein; a contractible sleeve in the opening having a screw-threaded inner end a tapered intermediate end, and a wrench-hold portion at its outer end, the wrench-hold portion having flats having a larger dimension than the opening; and a seal plate having an opening receiving the sleeve, said opening being of less diameter than the larger end of the wrench-hold, said opening having flats corresponding to the flats of the wrench-hold preventing the plate from turning relatively to the sleeve, said plate being held between the body and the sleeve as the sleeve is turned to place and being provided with a sealing wire receiving opening, a sealing wire extending through the opening and secured to the body, and a seal closing the wire.

3. In a conduit fitting, the combination of a body having a plurality of conduit openings therein; a contractible sleeve in each opening having wedging engagement with the the walls of the opening and screwed into the opening and contracted thereby; a seal lock for the sleeves comprising a seal plate for each sleeve threaded onto its sleeve and locked against turning on the sleeve and arranged between the sleeve and the body; a wire extending from one plate to the other; and a seal closing the wire.

In testimony whereof I have hereunto set my hand.

HOWARD A. SELAH.